(12) United States Patent  
DeJong

(10) Patent No.: US 7,949,214 B2  
(45) Date of Patent: May 24, 2011

(54) SUBSTRATE GUIDED RELAY WITH PUPIL EXPANDING INPUT COUPLER

(75) Inventor: Christian Dean DeJong, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 156 days.

(21) Appl. No.: 12/266,063

(22) Filed: Nov. 6, 2008

(65) Prior Publication Data

US 2010/0111472 A1    May 6, 2010

(51) Int. Cl.
*G02B 6/26*    (2006.01)
(52) U.S. Cl. .......................... 385/31; 385/37
(58) Field of Classification Search ............ None
See application file for complete search history.

(56) References Cited

U.S. PATENT DOCUMENTS

| | | | |
|---|---|---|---|
| 4,711,512 A * | 12/1987 | Upatnieks | 345/7 |
| 6,169,613 B1 * | 1/2001 | Amitai et al. | 359/15 |
| 6,577,411 B1 * | 6/2003 | David | 359/19 |
| 6,611,385 B2 * | 8/2003 | Song | 359/630 |
| 6,829,095 B2 | 12/2004 | Amitai | |
| 7,021,777 B2 | 4/2006 | Amitai | |
| 2004/0085649 A1 * | 5/2004 | Repetto et al. | 359/633 |
| 2005/0180687 A1 | 8/2005 | Amitai | |
| 2006/0228073 A1 * | 10/2006 | Mukawa et al. | 385/31 |
| 2006/0291021 A1 * | 12/2006 | Mukawa | 359/15 |
| 2007/0159673 A1 | 7/2007 | Freeman et al. | |
| 2007/0171329 A1 * | 7/2007 | Freeman et al. | 349/65 |
| 2008/0025667 A1 | 1/2008 | Amitai | |
| 2009/0190373 A1 * | 7/2009 | Bita et al. | 362/620 |

FOREIGN PATENT DOCUMENTS

| | | |
|---|---|---|
| WO | WO-2006/085308 | 8/2006 |
| WO | WO-2007/054928 | 5/2007 |
| WO | WO-2008/023367 | 2/2008 |

* cited by examiner

*Primary Examiner* — Hemang Sanghavi
(74) *Attorney, Agent, or Firm* — Kevin D. Wills

(57) ABSTRACT

An optical substrate guided relay (300) includes an optical substrate (302) having at least one major face (411), an output coupler (303) coupled to a major face (411,412), and an input coupler (301) coupled to a major face (411,412). The input coupler (301) is configured to reflect, via internal layers (414), portions of received light to the optical substrate 302. The input coupler (301) includes either one or more internal layers (414) or a contoured face (1040) with surfaces configured as reflectors that expand the received light and direct it into the optical substrate (302). The output coupler (303) expands a pupil of light in one direction and directs the expanded light away from the optical substrate guided relay.

18 Claims, 7 Drawing Sheets

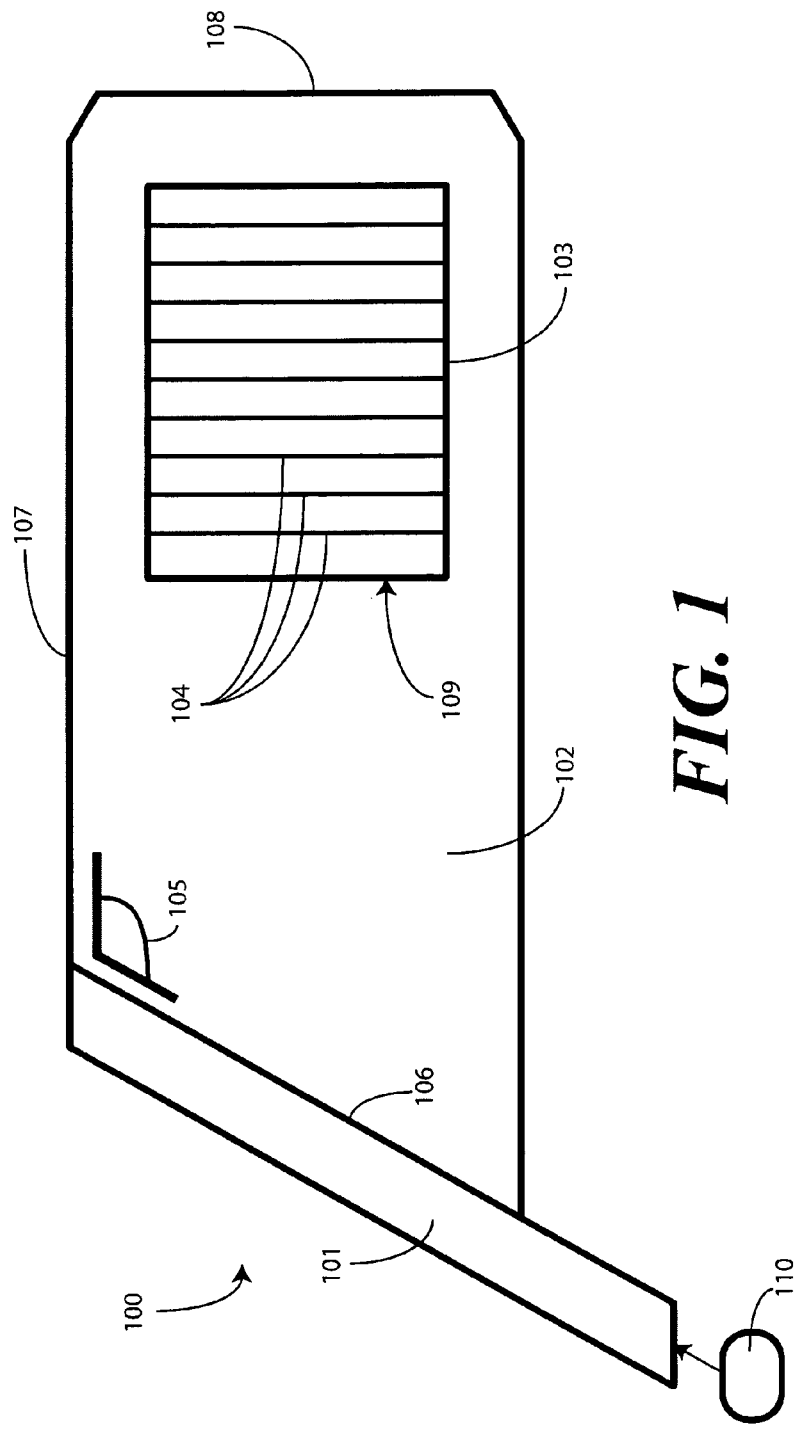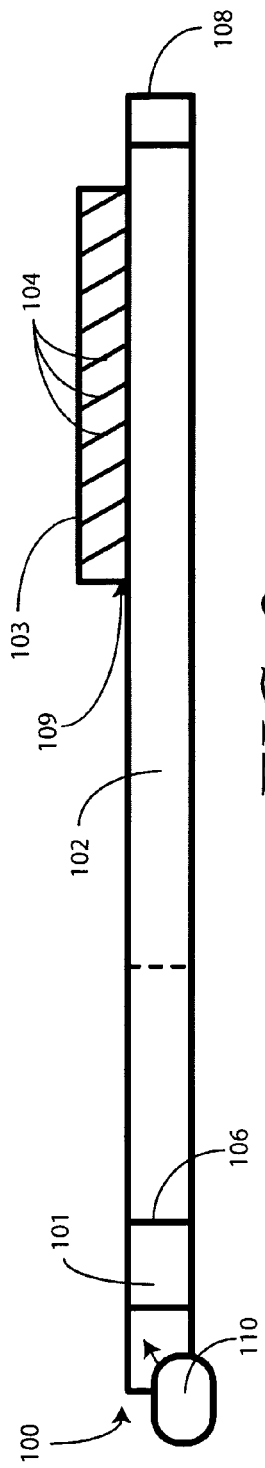

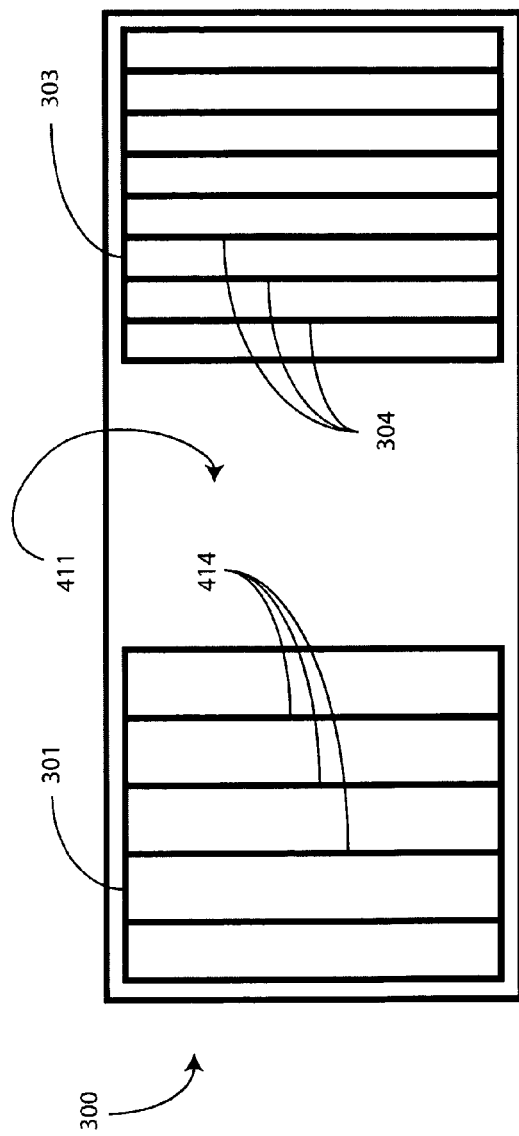
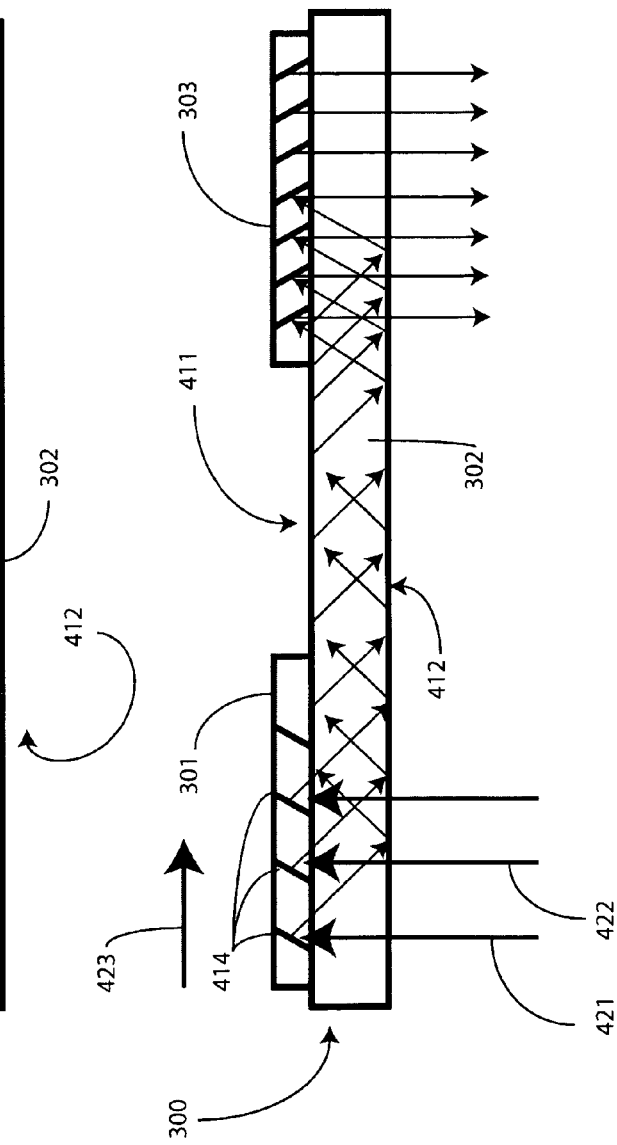

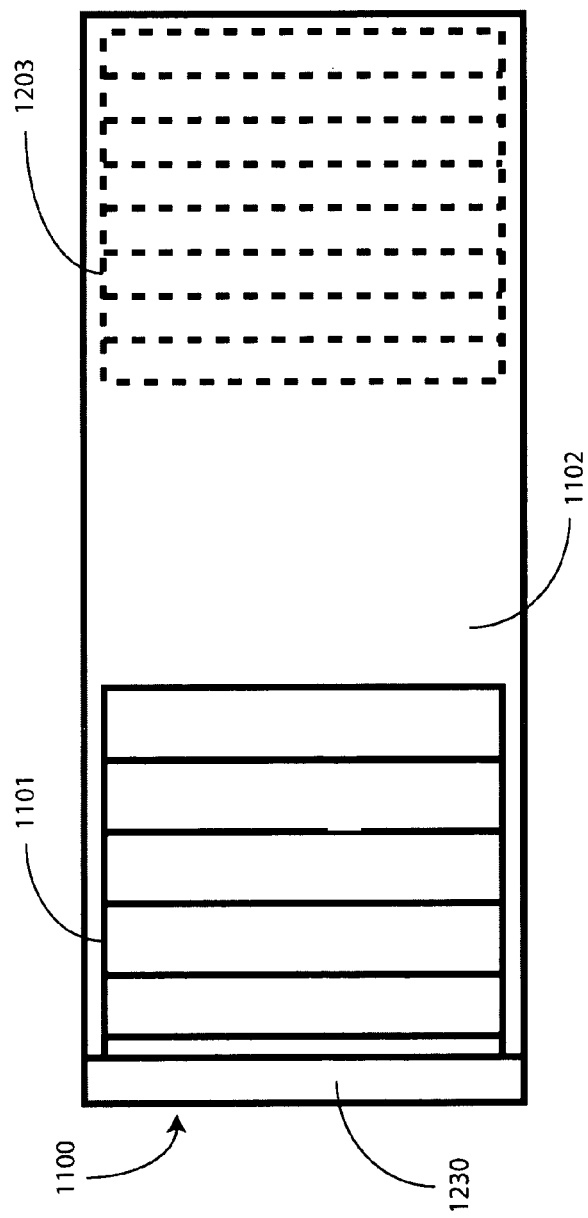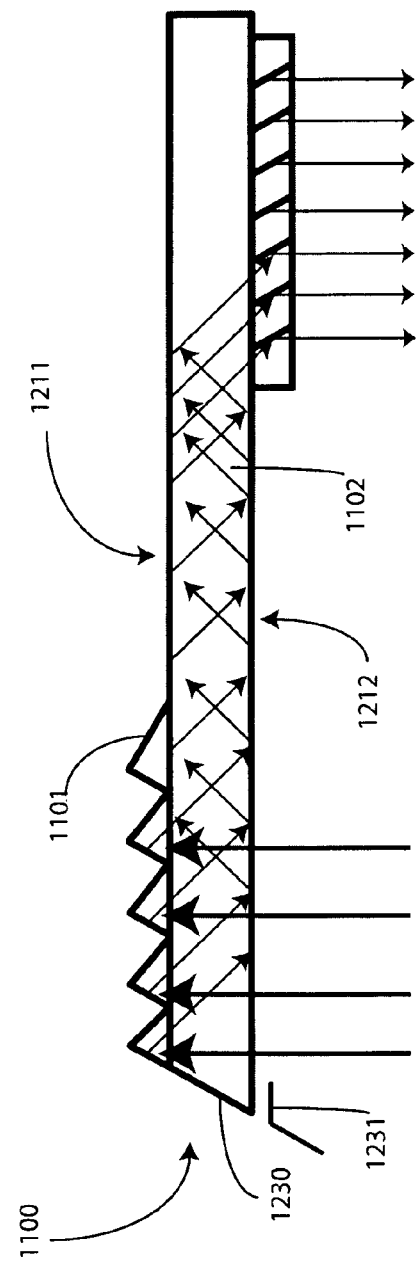

SUBSTRATE GUIDED RELAY WITH PUPIL EXPANDING INPUT COUPLER

BACKGROUND

1. Technical Field

This invention relates generally to optical relay systems, and more particularly to a substrate guided relay that includes an input coupler having one or more reflective surfaces configured to expand received light in at least one dimension.

2. Background Art

Substrate guided relays are devices that transmit light rays from a source to a viewer. Generally speaking, substrate guided relays are optical transfer devices having a light transporting substrate, which may manufactured from glass, fused silica, or other transparent media. The substrate directs light from an input coupler to an output coupler. The light is guided along its path by the optical transfer properties of the substrate. The output coupler then delivers the light to the viewer. In some applications, the output coupler directs the light to a viewing region that is either a projection surface or a user's eye. By way of example, one application for a substrate guided relay is that of a near-to-eye display where the substrate guided relay directs light into the pupil of a user.

Substrate guided relays generally include three basic components: an input coupler that collects and receives light from a source, a substrate that transfers the light, and an output coupler that delivers light away from the substrate. Once the input coupler collects and receives the light from a source, it delivers the light to the substrate. The substrate then delivers the light to the output coupler which directs the light in the direction preferred for observation. The substrate guided relay not only transmits the light, but can transform the light as well. For example, in many prior art substrate guided relay systems, the substrate also performs expansion of the light. This expansion helps to ensure that the resulting output "bundle" of light is larger than the input "bundle" of light. The expansion also helps to ensure that the output light is uniform and easily viewable. Where the input light is spatially encoded, as can be the case with a liquid crystal display source, a liquid crystal on silicon source, or a digital light processing source, the substrate can expand an image after it has been converted to an angularly encoded or collimated image in a variety of sizes.

While pupil expansion in the substrate works, there can be issues associated with substrate-dependent pupil expansion. First, the input couplers associated with such systems can be expensive to manufacture. Often the input coupler must be manufactured to tight tolerances and coupled to the substrate in a very precise fashion. Second, some input couplers tend to work primarily with small, collimated light beams. Larger collimated beam input can be difficult to handle in more traditional input couplers.

There is thus a need for a substrate guided relay having an input coupler capable of accommodating larger collimated beam inputs.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 a top, plan view of a substrate guided relay.

FIG. 2 illustrates a side, elevation view of a substrate guided relay.

FIG. 3 illustrates a top, plan view of one substrate guided relay in accordance with embodiments of the invention.

FIG. 4 illustrates a side, elevation view of one substrate guided relay in accordance with embodiments of the invention.

FIG. 11 illustrates a top, plan view of one substrate guided relay in accordance with embodiments of the invention.

FIG. 12 illustrates a side, elevation view of one substrate guided relay in accordance with embodiments of the invention.

Figure 5:
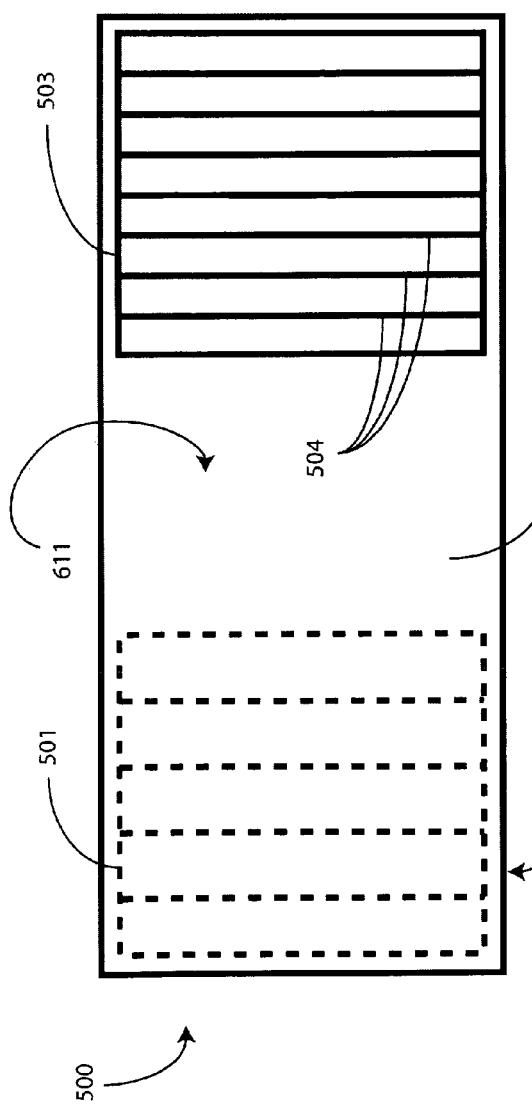
FIG. 5 illustrates a top, plan view of one substrate guided relay in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention employ an input coupler having one or more reflective surfaces integrated therein. The one or more reflective surfaces can be made from partially reflective layers disposed within the input coupler. Alternatively, the reflective surfaces can be full reflector layers disposed within the input coupler. In another embodiment, the reflective surfaces can be manufactured by configuring a saw-tooth geometry on one side of the input coupler and then using the slanted sides of the saw-tooth pattern as reflective layers. Further, an end surface of the substrate itself can be configured as a reflective surface. This end reflective surface can then be disposed parallel or coplanar with one of the reflective surfaces of the input coupler, thereby extending the function of the surface of the input coupler. The end may also act as the only reflective surface of the input coupler, making the input coupler a special treatment of the end of the slab guide rather than a separate component.

The one or more reflective surfaces expand a receiving surface for input light in at least one direction. This expanded receiving surface works to direct light having a cross section larger in one dimension than the input coupler into the optical substrate. The one or more reflective layers collect the expanded light received by the input coupler and direct this expanded light into the optical substrate. The expanded receiving surface is suitable, for instance, for larger collimated input beams such as those generated by liquid crystal display sources, liquid crystal on silicon sources, and digital light processing sources. The expanded receiving surface helps facilitate uniform illumination in the output image. The invention is not limited to large input sources, however. As will be illustrated below, embodiments of the invention can also be used with small light sources such as Microelectromechanical System (MEMS) light sources.

Turning now to FIGS. 1 and 2, illustrated therein is one embodiment of a substrate guided relay 100 having an input coupler 101, an optical substrate 102, and an output coupler 103. FIG. 1 is a top, plan view of the substrate guided relay 100, while FIG. 2 is a side elevation view of the substrate guided relay 100. Embodiments and operating characteristics of such substrate guided relays are described in commonly assigned, copending U.S. patent application Ser. No. 11/775,511, filed Jul. 10, 2007, entitled "Substrate-Guided Relays for Use with Scanned Beam Light Sources," which is incorporated herein by reference.

In the embodiment of FIG. 1, the input coupler 101 is coupled to the optical substrate at an angle 105. This angle affects how light leaves the input coupler 101 and enters the optical substrate 102. This angle 105 is generally between 30 and 60 degrees. The manufacturing tolerances associated with connecting the input coupler 101 to the optical substrate 102 at this angle 105 are relatively precise.

The input coupler 101 collects and receives light, such as light from a light source 110. Alternatively, the input coupler 101 can act as a light homogenizing device. In this capacity the input coupler 101 make copies of incoming light before the light exits the input coupler 101. Examples of this type of input coupler are disclosed in commonly assigned, co-pending U.S. patent application Ser. Nos. 12/167,892 and 12/167,882, entitled "Optical Substrate Guided Relay with Input Homogenizer" and "Substrate Guided Relay with Homogenizing Input Relay," each filed on Jul. 3, 2008, each of which is incorporated herein by reference.

A variety of light sources can be used with the substrate guided relay 100. Examples of light sources include light emitting diode light sources, liquid crystal display light sources, processing light sources, digital light processing light sources, or MEMS light sources.

Light is delivered from the input coupler 101 to the optical substrate 102 through a first interface 106. The input coupler 101 can be coupled to the optical substrate 102 along the first interface 106 in a variety of ways, including adhesives, glues, and epoxies, or through optical contacting. As is known in the art, where the optical contacting process is used, this bond can be enhanced by chemically treating the surfaces prior to contacting.

The first interface 106 can include a partially reflective coating. This reflective coating can be a metallic coating, such as silver, that is configured to work as a p-polarization partially reflective coating. Silver coatings are useful as they can be used to vary reflectance along the first interface 106 by varying the thickness of the silver layer. For instance, such a coating can have a high reflectance near the input, and a lower reflectance further from the input. In some applications, s-polarization partially reflective coatings can be used at the first interface 106 as well. The reflective coating can also be designed to be neutral with respect to polarization or to work with either s-polarzied or p-polarized light.

Details about the construction of partially reflective coatings may be found in application Ser. No. 11/603,964, entitled "Substrate-Guided Display with Improved Image Quality," filed Nov. 21, 2006 and incorporated by this reference in its entirety. S-polarization partially reflective coatings generally include coatings that have an s-polarization reflectance within a thirty to seventy percent range, and a lower (generally less than ten percent or so) reflectance p-polarization reflectance for angles and wavelengths of interest. P-polarization partially reflective coatings generally include coatings that reflect both p-polarized light and s-polarized light, and exhibit reflectance of p-polarized light at a wavelength and angle of interest greater than twenty percent operating in the vicinity of Brewster's angle (for a low index material with an index—approximately 1.5—and a high index material with refractive index of 1.7-2.1, the angle is approximately fifty degrees when going from high index to low index, and 30 degrees when going from low index to high index).

Once light is delivered from the input coupler 101 to the optical substrate 102 through the first interface 106, the light passes along the optical substrate 102 to the output coupler 103. The optical substrate 102 can vary in thickness and length. The distal end 108 of the optical substrate 102 can be squared, semi-hexagonal, rounded, or may take other shapes. Additionally, the top and bottom edges of the optical substrate 102 can take on a variety of shapes or geometrical configurations.

Light passing along the optical substrate 102 is generally confined within the optical substrate 102 by the principles of total internal inflection. Alternatively, the light passing through the optical substrate 102 but may be confined by within the optical substrate 102 some other means such as reflective coatings. When the light reflects off a edge of the optical substrate 102, e.g., edge 107, it is generally absorbed. Partially reflective coatings, including s-polarization partially reflective coatings, can be used along the faces of the optical substrate to assist with total internal reflection transfer. Coatings may also be used to modify, enhance, or otherwise change the phase change that occurs on each reflection.

Once light as passed sufficiently along the optical substrate 102, the light reaches the output coupler 103. The output coupler 103 is configured to receive light from the optical substrate 102 and to enable a viewer (not shown) to see a displayed image, whether it be projected on a projection surface or directed into the viewer's eye. The output coupler 103 directs light to the viewer through a plurality of partially reflective layers 104. Note that the output coupler 103 may be disposed either on top of, or beneath, the optical substrate 102.

As with the input coupler 101, the output coupler 103 can be coupled to the optical substrate 102 in a variety of ways, including adhesives, glues, or optical contacting. Light enters the output coupler 103 through the second interface 109. The second interface 109, which occurs between the optical substrate 102 and the output coupler 103, can include a partially reflective coating.

The output coupler 103 can further include a series of partially reflective layers 104 that are configured to receive light from the optical substrate 102 and to direct the light away from the substrate guided relay 100. The array of partially reflective layers 104 helps both to direct light away from the substrate guided relay 100 and to expand the exit pupil of the overall device. Note that while partially reflective coatings are used as the partially reflective layers 104 in one embodiment, it will be clear to those of ordinary skill in the art having the benefit of this disclosure that the invention is not so limited. Other devices, including diffractive elements, holograms or lenses, may also be used in conjunction with the output coupler 103.

Turning now to FIGS. 3 and 4, illustrated therein is one substrate guided relay 300 in accordance with embodiments of the invention. FIG. 3 is a top, plan view, while FIG. 4 is a side, elevation view.

The substrate guided relay 300 includes an input coupler 301, an optical substrate 302, and an output coupler 303. The optical substrate 302 has at least one major face 411. In the illustrative embodiment of FIGS. 3 and 4, the optical substrate has two major faces—a first major face 411 and a second major face 412. The input coupler 301 and output coupler 303 are both coupled to a single face—the first major face 411. In one embodiment the input coupler 301 and output coupler 303 are coupled to the first major face 411 by optical contacting. While both the input coupler 301 and output coupler 303 are coupled to one major face, as will be illustrated in more detail below, they may be coupled to alternate faces, such as with the input coupler 301 being coupled to the second major face 412 while the output coupler 303 is coupled to the first major face 411, or vice versa. Additionally, they may both be coupled to the opposite major face—i.e., the second major face 412.

A partially reflective coating may be disposed between the input coupler 301 and the optical substrate 302. Alternatively, the input coupler 301 can be coupled to the optical substrate 302 with no partially reflective coating disposed therebetween.

In the exemplary embodiment of FIGS. 3 and 4, the output coupler 303 is disposed distally across the optical substrate 302 from the input coupler 301. The output coupler 303 is configured to receive light from the optical substrate 302. In one embodiment, a partially reflective coating, such as a fifty percent s-polarizing partially reflective coating, may be disposed between the output coupler 303 and the optical substrate 302. Note that this coating can be designed so as to have a varying reflectance layer across its interface. For example, regions of the output coupler 303 disposed closer to the input coupler 301 may have an area of higher reflectivity (such as sixty percent), while regions of the output coupler 303 disposed more distally relative to the input coupler 301 may have an area of lower reflectivity (such as forty percent). Further, the varied reflectivity surface may have discrete sections, or may continually vary, such as incrementally varying from a high reflectivity at area to a low reflectivity at area. Additionally, reflectivity may vary as a function of angle of incident light, polarization of incident light, wavelength of incident light, or any combination thereof. Varying the reflectivity/transmissivity provides—in some applications—for a different transmission of light beams from the optical substrate 302 to the output coupler 303.

As with FIGS. 1 and 2, in one embodiment the output coupler 303 includes a plurality of partially reflective layers 304 that are configured to direct light away from the substrate guided relay 300 as an output image. In one embodiment, the plurality of partially reflective layers 304 is disposed within the output coupler 303 and comprises a plurality of partially reflective coatings. Partially reflective coatings provide a visual image to a viewer while still permitting the viewer to see through the overall substrate guided relay 300. As such, a user employing the substrate guided relay 300 as a display apparatus in eyeglasses would be able to concurrently see both images afar and images presented by the substrate guided relay 300.

In one embodiment, the one or more partially reflective layers 304 may be disposed substantially parallel with one another. In some applications, the one or more partially reflective layers 304 may have substantially similar partial reflection coatings creating a substantially uniform output coupler transmission so that ambient light passing through the output coupler 303 is substantially uniform. In FIGS. 3 and 4, the input coupler 301 includes one or more internal layers 414 that are configured to expand the functional receiving surface for received light in at least one direction. With the expanded functional surface, the input coupler 301 can "couple in" different portions of an extended collimated source, such as a spatially extended image produced by liquid crystal display systems, liquid crystal on silicon systems, digital light projection systems, and so forth. (The extended collimated source is often generated with a collimating lens.) The input coupler 301 does this by reflecting portions of the expanded, received light off the one or more internal layers 414 into the optical substrate 302. In one embodiment, the one or more internal layers 414 comprise a series of partially reflective layers such as those in the output coupler 303. In another embodiment, the one or more internal layers 414 comprise reflectors (reflectors can be used because a user generally needn't look through the input coupler 301).

The one or more internal layers 414 are configured to direct light from the input coupler 301 into the optical substrate 302 by reflecting portions of the light off each internal layer 414. The one or more internal layers 414 may even expand the light in at least one direction. By being able to "catch" a wider beam of light, the one or more internal layers 414 provide an expanded functional surface for the input beam. This can best be seen in FIG. 4. Light ray 421 reflects off of one of the internal layers 414 into the optical substrate 302. This light ray 421 then begins bouncing along the optical substrate 402, confined by substantially total internal reflection, until it passes to the output coupler 303. Similarly, light ray 422 reflects off of one of the internal layers 414 into the optical substrate 302 and bounces along the optical substrate 402 until it passes to the output coupler 303. As such, the one or more internal layers 414 have the effect of expanding the functional surface of the input beam in the X-direction 423 prior to delivering the received light to the optical substrate 302. Expansion of the pupil of light is handled by the optical substrate 302.

In one embodiment, the one or more internal layers 414 comprise between one and ten layers. However, etching processes can provide five hundred or more internal layers 414. Generally speaking, smaller light sources—such as MEMS sources—will use fewer layers while larger light sources—such as liquid crystal display light sources—will use more layers. For example, where a MEMS source is used, only one or two reflective layers may be used in the input coupler 301. Where a liquid crystal display source is used, five or six reflective layers may be used in the input coupler 301. Further, the number of reflective layers may be determined by application requirements for the substrate guided relay 300. Where larger numbers of reflective layers are used, the input coupler 301 can be manufactured thinner than when fewer layers are used. There is a direct ratio to the thickness reduction per additional reflective layer for a given input beam size.

As noted above, the one or more internal layers 414 can be used to expand the input beam spatially. By way of example, a 1 millimeter beam with having a 40 degree field of view can be transformed into a 2 millimeter beam having a 20 degree field of view. The substrate guided relays of the present invention can also be used in conjunction with light homogenization devices, as recited in the '892 and '882 applications cited above.

One advantage offered by embodiments of the present invention is that they are less expensive to manufacture than are many prior art substrate guided relays. Embodiments can be less expensive because alignment tolerances between the input coupler 301 and the substrate guided relay 300 can be relaxed when compared to prior art systems. In effect, softer manufacturing tolerances can be used while retaining adequate output image resolution. For instance, in one embodiment the input coupler 301 can be configured identically to the output coupler 303. In another embodiment, the input coupler 301 is different in that it has fewer layers that are totally reflective, while the output coupler 303 has a larger number of partially reflective internal layers. However, once the input coupler manufacturing process is refined and complete, the input couplers of the present invention may simply be optically contacted to the major faces of the substrates without the precise alignment and angle measurements required by prior art substrate guided relays.

Figure 6:
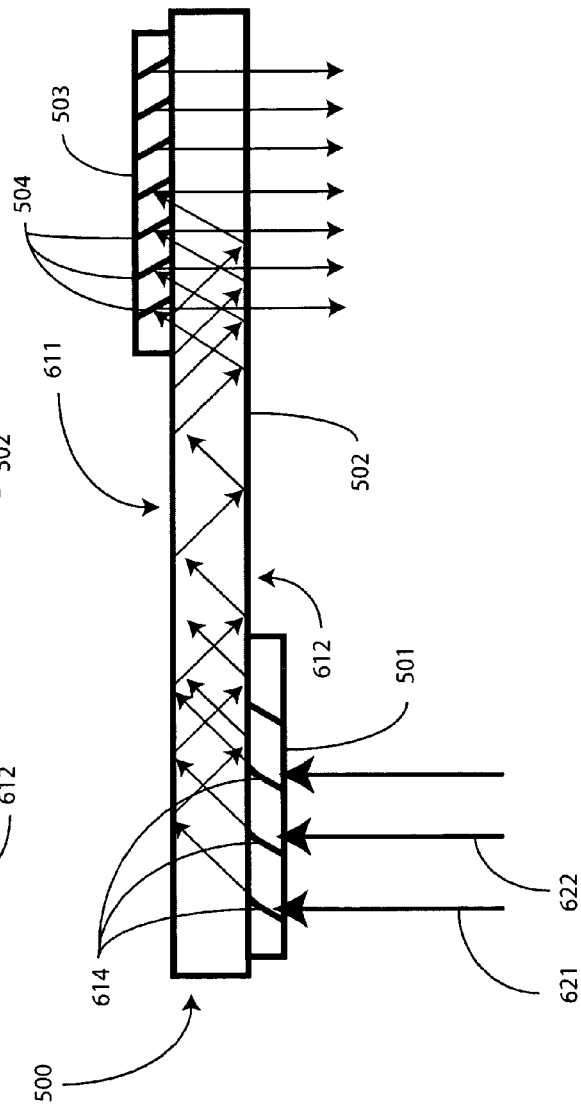
FIG. 6 illustrates a side, elevation view of one substrate guided relay in accordance with embodiments of the invention.

Turning now to FIGS. 5 and 6, illustrated therein is another substrate guided relay 500 in accordance with embodiments of the invention. FIG. 5 is a top, plan view, while FIG. 6 is a side, elevation view.

The embodiment of FIGS. 5 and 6 illustrates the diversity of placement of the input coupler 501 relative to the optical substrate 502 and output coupler 503 offered by embodiments of the invention. While the embodiment of FIGS. 3 and 4 had the input coupler (301) and output coupler (303) coupled to the same major face (411), in FIGS. 5 and 6 the input coupler 501 and output coupler 503 are coupled to different faces.

In FIGS. 5 and 6, the optical substrate 502 includes two major faces, a first major face 611 and a second major face 612. The output coupler 503 is coupled to the first major face 611, while the input coupler 501 is coupled to the second major face 612. Note that the opposite could also be true—the input coupler 501 could be coupled to the first major face 611 while the output coupler 503 was coupled to the second major face 612. Additionally, the input coupler 501 and output coupler 503 could both be coupled to the second major face 612. Note also that though the illustrations show light entering and exiting the substrate guided relay at angles substantially perpendicular to the optical substrate 502, light may enter the input coupler 501 and any angle. Additionally, light may exit the output coupler 503 at any angle as well. In some typical applications, the light beams enter and exit the substrate guided relay at angles less than 30 degrees.

As shown in FIGS. 5 and 6, one or more internal layers 614 in the input coupler 501 are configured to direct light from the input coupler 501 into the optical substrate 502. The one or more internal layers 614 provide an expanded receiving surface with which to direct light into the optical substrate 502. The internal layers 614 in the input coupler 501 and internal layers 504 in the output coupler 503 work together to provide spatial expansion—they expand the light in at least one direction. Specifically, the internal layers 504 of the output coupler 503 make copies of the light directed away from the output coupler 503 so as to expand the pupil of that light. This can best be seen in FIG. 6. Light ray 621 reflects off of one of the internal layers 614 into the optical substrate 502. This light ray 621 then begins bouncing along the optical substrate 502, confined by substantially total internal reflection, until it passes to the output coupler 503. The layers 504 of the output coupler 503 then expand the pupil of the light and direct it away from the substrate guided relay 500. Similarly, light ray 622 reflects off of one of the internal layers 614 into the optical substrate 502 and bounces along the optical substrate 502 until it passes to the output coupler 503. As such, the one or more internal layers 614 have the effect of expanding the receiving surface for the input beam in the X-direction prior to—or while—delivering the received light to the optical substrate 502. Expansion in other directions is handled by the layers 504 of the optical substrate 502.

The internal layers of the output coupler 503 provide expansion of the light as it exits the substrate guided relay 500. The reflectors of the output coupler 503 perform pupil expansion in one direction, while the internal layers 614 of the input coupler 501 permit a large or already expanded pupil to be coupled into the substrate guided relay 500. Each reflector in the output coupler 503 reproduces all or a substantial portion of that pupil. Thus the width of the pupil coming out of the output coupler 503 is roughly equal to the width of the input beam pupil plus the width of the output coupler 503.

Note that while light is shown entering the substrate from the input coupler, the substrate guided relay 500 can be configured in the opposite orientation. Light can enter through the first major face 611 and then reflect off the internal layers 614 of the input coupler 501, which is coupled to the second major face 612, into the optical substrate 502. In such a configuration, the angle of the internal layers 614 would be reversed. Note also that while light is drawn as entering the substrate guided relay 500 from the bottom or back and exiting from the bottom or back, light could alternatively enter or exit the substrate guided relay 500 from the front and then exit, or enter from the one side and exit from the opposite side.

Regarding the spacing between the internal layers 614, they are configured in one embodiment such that the distance between each layer, relative to the major face of the optical substrate to which the input coupler is connected, will receive all the light without being interfered by another internal layer. It is also possible to design the input coupler 501 and/or the output coupler 503 so that some, most, or all light is intended to impinge on two or more layers. In this case the input coupler 501 would perform additional pupil expansion and/or increase or improve the uniformity of the pupil. Generally, in this configuration, the reflectance of the individual layers 614 would be lower. This configuration, which will change depending upon application requirements, is dependent upon the number of internal layers used in the input coupler and their spacing.

Figure 7:
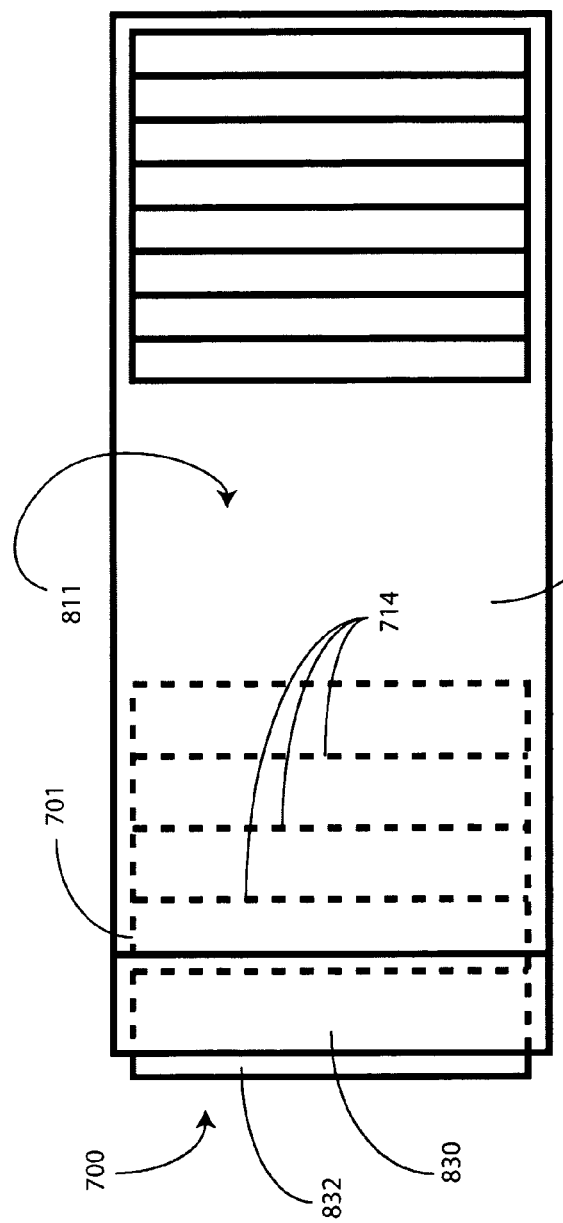
FIG. 7 illustrates a top, plan view of one substrate guided relay in accordance with embodiments of the invention.
Figure 8:
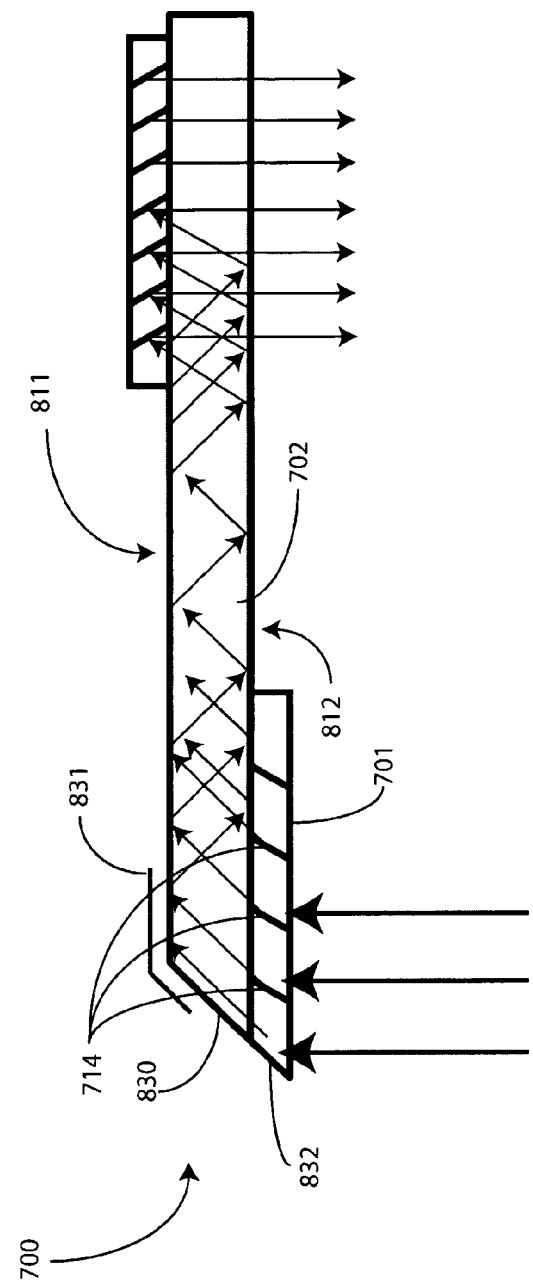
FIG. 8 illustrates a side, elevation view of one substrate guided relay in accordance with embodiments of the invention.

Turning now to FIGS. 7 and 8, illustrated therein is another substrate guided relay 700 in accordance with embodiments of the invention. FIG. 7 is a top, plan view, while FIG. 8 is a side, elevation view.

In the embodiments of FIGS. 7 and 8, the end portion 830 of the optical substrate 702 extends at a non-orthogonal angle 831 from one of the major faces 811,812 of the optical substrate 702. In one embodiment, this end portion 830 can be polished, coated, or otherwise configured as a reflector to extend the function of the input coupler 701. In such a configuration, either an input coupler edge 832 or one of the internal layers 714 can be aligned with the end portion 830 to extend the single-ended spatial extending function.

For instance, in one embodiment, the input coupler edge 832 can be configured to be parallel or substantially coplanar with the end portion 830. Where this input coupler edge 832 is configured as a reflector, the input coupler edge 832 and end portion 830 combine to reflect incoming light—expanded spatially in one direction—into the optical substrate 702.

Alternatively, one of the internal reflective layers 714 of the input coupler 701 can be arranged substantially parallel—or in a substantially coplanar arrangement—with a plane defined by the end portion 830. Again, this alignment of internal reflective layers 714 and end portion 830 works to extend the expansion function.

Figure 9:
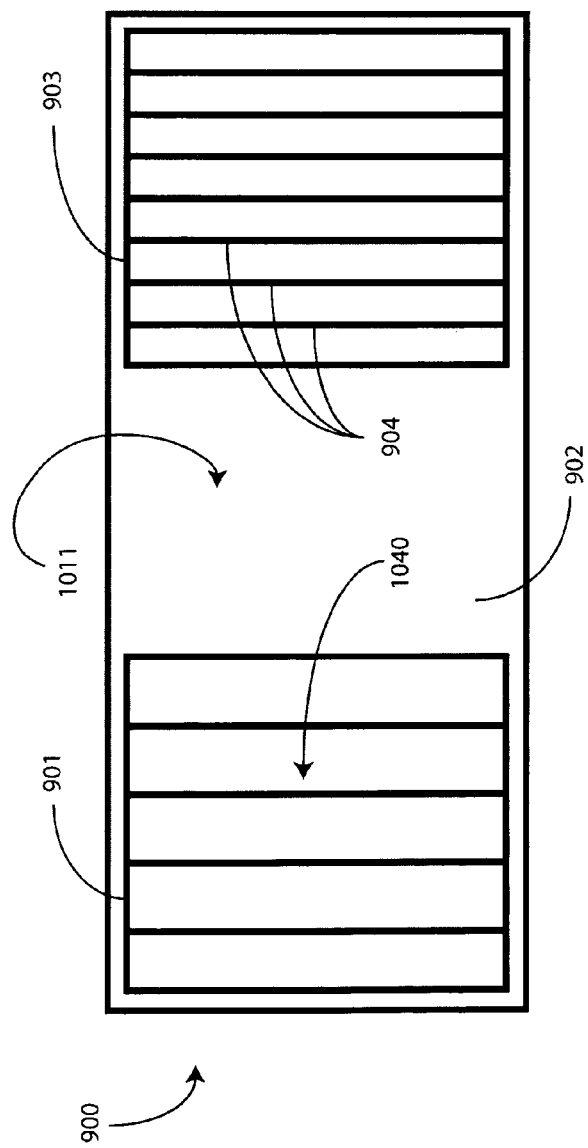
FIG. 9 illustrates a top, plan view of one substrate guided relay in accordance with embodiments of the invention.
Figure 10:
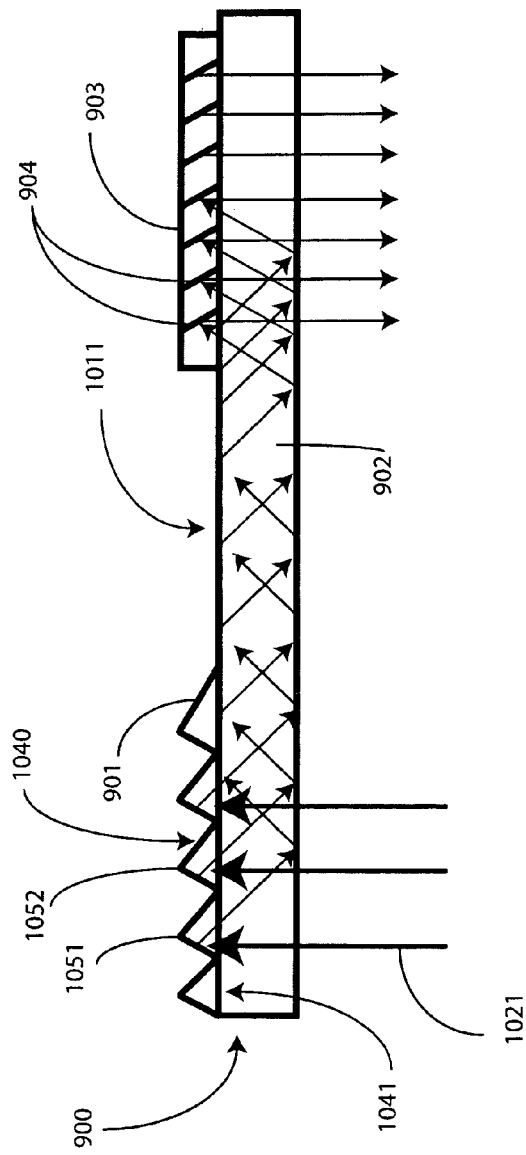
FIG. 10 illustrates a side, elevation view of one substrate guided relay in accordance with embodiments of the invention.

Turning now to FIGS. 9 and 10, illustrated therein is another substrate guided relay 900 in accordance with embodiments of the invention. FIG. 9 is a top, plan view, while FIG. 10 is a side, elevation view.

The substrate guided relay 900 of FIGS. 9 and 10 works in principle the same way as do previous embodiments. The substrate guided relay 900 includes, for instance, an optical substrate 902 having at least one major face 1011 and an output coupler 903 coupled to the at least one major face 1011 and having a plurality of partially reflective layers 904 for direct light received from the optical substrate 902 away from the substrate guided relay 900.

The substrate guided relay 900 also includes an input coupler 901 that is configured to receive light from a source and to expand that received light in one direction and deliver it to the optical substrate 902. As with other embodiments, the input coupler 901 includes reflectors to perform the expansion. However, in the embodiment of FIGS. 9 and 10, the reflectors are configured differently. Rather than being internal reflective layers, in this embodiment the input coupler 901 includes an input coupler face 1041 and a contoured face 1040. The input coupler face 1041 is coupled to a major face 1011 of the optical substrate 902. The contoured face 1040 is configured as one or more reflectors. In the illustrative embodiment of FIGS. 9 and 10, the contoured face 1040 is configured as a saw-tooth contour so as to expand received light. An input coupler 901 of this type has the advantage of being a "moldable part" in manufacture without a defined internal layer structure. Alternatively, the input coupler 901 and the optical substrate 902 could be a single molded part with no internal structures.

As with previous embodiments, the illustrative embodiment shown in FIGS. 9 and 10 includes between one and six saw teeth. The slanted sides of each of the saw teeth, e.g., saw tooth 1051 and 1052, is configured as a reflector to direct light 1021 into the optical substrate. As with previous embodiments, where the input coupler 901 includes a contoured face 1040, the input coupler 901 and output coupler 903 can be coupled to a single major face of the optical substrate 902 or different major faces. For instance, the output coupler 903 can be coupled to the first major face 1011 while the input coupler 901 is coupled to the second major face 1012, or vice-versa. Additionally, light can be received through the first major face 1011 or second major face, depending upon the angle of the reflectors of the input coupler 901.

Turning now to FIGS. 11 and 12, illustrated therein is another substrate guided relay 1100 in accordance with embodiments of the invention. FIG. 11 is a top, plan view, while FIG. 12 is a side, elevation view.

In FIGS. 11 and 12, the optical substrate 1102 includes an end portion 1230. The end portion 1230 is adjacent to the input coupler 1101 and extends at a non-orthogonal angle 1231 from one or more of the major faces 1211,1212. The configuration of the input coupler 1101 can be aligned with the end portion 1230 to expand the functionality of the input coupler 901. For example, a plane defined by at least one of the saw teeth can be aligned in a substantially parallel or coplanar fashion with the end portion 1230 as shown in FIGS. 11 and 12. Note that either the input coupler 1101 by itself, or the combination of the input coupler 1101 and the output coupler 1102, could be manufactured as molded parts.

Figure 13:
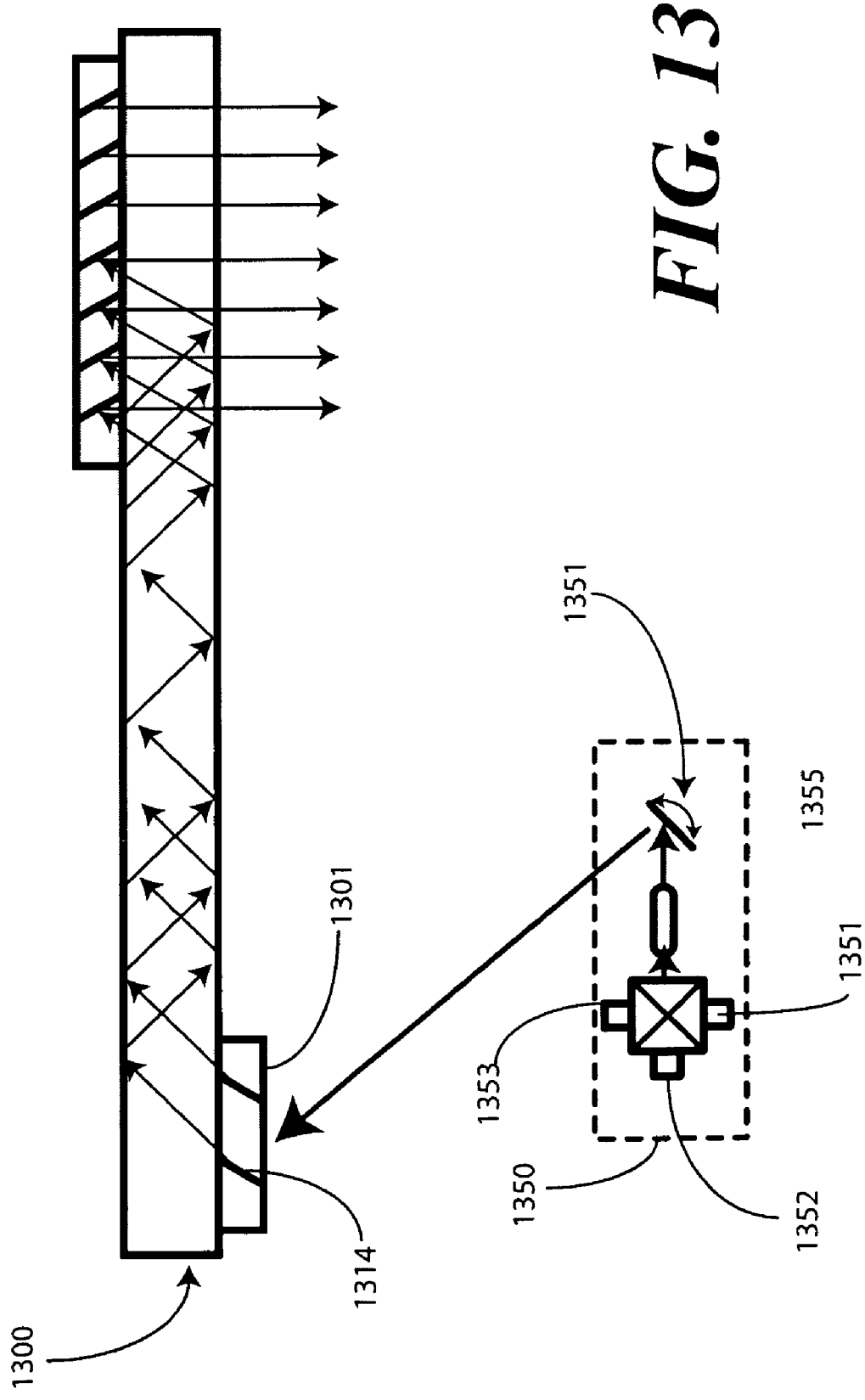
FIG. 13 illustrates one embodiment of a substrate guided relay being used with a MEMS scanned light source in accordance with embodiments of the invention.

Turning now to FIG. 13, illustrated therein is one substrate guided relay 1300 in accordance with embodiments of the invention being used with a scanned light source 1350. As noted above, embodiments of the present invention work well where input light is spread over an area spanning or substantially spanning the area of the input coupler. For instance, liquid crystal display sources and liquid crystal on silicon sources work well with embodiments of the invention. However, embodiments of the invention are not so limited. They can equally be used with light sources having small input light beams, such as the MEMS scanned light source 1350 shown in FIG. 13. Examples of MEMS scanning light sources, such as those suitable for use with embodiments of the present invention, are set forth in US Patent Publication No. 2007/0159673, entitled, "Substrate-guided Display with Improved Image Quality," which is incorporated by reference herein.

In FIG. 13, the MEMS scanned light source 1350 employs three light sources 1352,1353,1354. A beam combiner combines the output of light sources 1352,1353,1354 to produce a combined modulated beam. A variable collimation or variable focusing optical element 1355 produces a variably shaped beam that is scanned by the scanning mirror 1351 as variably shaped scanned light beam, which is launched into input coupler 1301 of the substrate guided relay 1300. Note that where a MEMS or other scanned light source is used, the number of reflective layers 1314 used in the input coupler 1301 may be only one or two.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An optical substrate guided relay, comprising:
   an optical substrate having at least one major face;
   an output coupler coupled to the at least one major face and comprising a plurality of partially reflective layers configured to perform pupil expansion on light received from the optical substrate in one dimension and to direct the light away from the optical substrate guided relay; and
   an input coupler configured to receive light from a source, the input coupler being coupled to the at least one major face and comprising a plurality of reflective layers configured to extend a functional receiving surface for the light from the source.

2. The optical substrate guided relay of claim 1, wherein the at least one major face comprises at least two major faces, wherein both the output coupler and the input coupler are coupled to a single one of the at least two major faces.

3. The optical substrate guided relay of claim 1, wherein the at least one major face comprises a first major face and a second major face, wherein the output coupler is coupled to the first major face and the input coupler is coupled to the second major face.

4. The optical substrate guided relay of claim 1, wherein the input coupler is further configured to deliver received light to the optical substrate, wherein the received light comprises one or more reflected portions of the light from the source.

5. The optical substrate guided relay of claim 1, wherein the plurality of reflective layers comprise between two and 10 internal layers.

6. The optical substrate guided relay of claim 1, wherein the optical substrate comprises an end portion, adjacent to the input coupler and extending at a non-orthogonal angle from the at least one major face.

7. The optical substrate guided relay of claim 6, wherein the plurality of reflective layers are parallel with a plane defined by the end portion.

8. The optical substrate guided relay of claim 6, wherein the end portion is configured as a reflector.

9. The optical substrate guided relay of claim 1, further comprising a partially reflective layer disposed between the input coupler and the optical substrate.

10. The optical substrate guided relay of claim 1, wherein the source comprises one of a liquid crystal display source, a liquid crystal on silicon source, a digital light processing source, or a MEMS scanning source.

11. An optical substrate guided relay, comprising:
an optical substrate having at least one major face;
an output coupler coupled to the at least one major face and comprising a plurality of partially reflective layers configured to perform pupil expansion on light received from the optical substrate and direct the light received from the optical substrate away from the optical substrate guided relay; and
an input coupler configured to receive light from a source, the input coupler having an input coupler face coupled to the at least one major face and a contoured face disposed opposite the input coupler face and configured as one or more reflectors, wherein the one or more reflectors are configured to reflect portions of the light received from the source into the optical substrate.

12. The optical substrate guided relay of claim 11, wherein the contoured face comprises a saw-tooth contour.

13. The optical substrate guided relay of claim 12, wherein the saw-tooth contour comprises between one and five hundred saw-teeth.

14. The optical substrate guided relay of claim 11, wherein the at least one major face comprises at least two major faces, wherein both the output coupler and the input coupler face are coupled to a single one of the at least two major faces.

15. The optical substrate guided relay of claim 11, wherein the at least one major face comprises a first major face and a second major face, wherein the output coupler is coupled to the first major face and the input coupler face is coupled to the second major face.

16. The optical substrate guided relay of claim 11, wherein the optical substrate comprises an end portion, adjacent to the input coupler and extending at a non-orthogonal angle from the at least one major face, wherein a plane defined by at least one contour of the contoured face is substantially parallel with the end portion.

17. The optical substrate guided relay of claim 16, wherein the input coupler further comprises an input coupler edge that is substantially coplanar with the end portion.

18. The optical substrate guided relay of claim 17, wherein the source comprises one of a liquid crystal display source, a liquid crystal on silicon source, a digital light processing source, or a MEMS scanning source.

* * * * *